(12) United States Patent
Zhang et al.

(10) Patent No.: US 10,026,291 B2
(45) Date of Patent: Jul. 17, 2018

(54) METHODS AND SYSTEMS FOR WORKPLACE SAFETY RISK AVOIDANCE

(71) Applicant: Ford Global Technologies, LLC, Dearborn, MI (US)

(72) Inventors: Kadin Zhang, Nanjing (CN); Fernando Zhao, Nanjing (CN); Bruce Lee, Nanjing (CN); Jonas Liu, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/416,167

(22) Filed: Jan. 26, 2017

(65) Prior Publication Data

US 2017/0221334 A1    Aug. 3, 2017

(30) Foreign Application Priority Data

Jan. 28, 2016 (CN) .......................... 2016 1 0059347

(51) Int. Cl.
| | | |
|---|---|---|
| G08B 17/00 | (2006.01) | |
| G08B 21/02 | (2006.01) | |
| G01S 5/10 | (2006.01) | |
| G08B 25/10 | (2006.01) | |

(52) U.S. Cl.
CPC ............... *G08B 21/02* (2013.01); *G01S 5/10* (2013.01); *G08B 21/0261* (2013.01); *G08B 25/10* (2013.01)

(58) Field of Classification Search
CPC .................................. G08B 21/02; G01S 5/10
USPC ............ 340/686.1, 435, 438, 461, 456, 469
See application file for complete search history.

(56) References Cited

U.S. PATENT DOCUMENTS

| | | | |
|---|---|---|---|
| 6,232,887 B1 | 5/2001 | Carson | |
| 7,924,152 B1 | 4/2011 | Daniel | |
| 8,248,263 B2 | 8/2012 | Shervey et al. | |
| 8,710,979 B2 | 4/2014 | Frederick | |
| 9,820,120 B2 * | 11/2017 | deCharms | ............... H04W 4/22 |
| 2011/0260856 A1 * | 10/2011 | Rossmann | ............ G01S 5/0205 |
| | | | 340/539.13 |
| 2014/0077961 A1 | 3/2014 | Frederick | |
| 2015/0161452 A1 * | 6/2015 | McCarthy | .............. G05B 15/02 |
| | | | 348/143 |
| 2015/0170498 A1 | 6/2015 | Beggs et al. | |

* cited by examiner

*Primary Examiner* — Tai T Nguyen
(74) *Attorney, Agent, or Firm* — Mohr IP Law Solutions, PC (57) ABSTRACT

A method is provided to avoid risk at a workplace. The method comprises establishing an indication including a first region with a first safety level at the workplace; determining a position of an object in the workplace and generating position information; and issuing a first alert if it is determined that the object is in the first region based on the position information and the indication.

19 Claims, 5 Drawing Sheets

METHODS AND SYSTEMS FOR WORKPLACE SAFETY RISK AVOIDANCE

RELATED APPLICATION

This application claims the benefit of Chinese Patent Application No.: CN 201610059347.2 filed on Jan. 28, 2016, the entire contents thereof being incorporated herein by reference.

FIELD

The present invention relates to safety at a workplace, specifically, relates to methods and systems to avoid risk at a workplace or alert risk at the workplace.

BACKGROUND OF THE INVENTION

At a vehicle manufacture site, an occurrence of an accident commonly due to pedestrian walking or standing at a dangerous region and being injured by a vehicle that carries cargo (i.e., cargo vehicle). Because of special design of the cargo vehicle, a driver cannot see the pedestrians in front the cargo vehicle when the cargo vehicle is loaded. Further, an accident may occur if a pedestrian is located within a machine operation area. Therefore, an alert system is commonly installed at a workplace to warn the workers of oncoming risk situation.

For example, the U.S. Pat. No. 6,232,877 discloses a warning system to alert a user of an approaching vehicle to prevent an accident. The alert system includes a receiver disposed on a safety vest or a shoe, an emitter and a processor installed on the vehicle. The processor receives a signal and processes the signal to provide information to alert the user. The safety vest includes a vibrator that alerts the user by vibrating when triggered. The safety vest includes a microphone or a horn that may be activated when receiving a signal emitted from the emitter. Thus, the alert system warns the worker located at a remote distance about the oncoming danger. However, the warning systems in the existing technologies only calculate an actual spatial distance of a person (i.e., an actual distance to a vehicle and a dangerous object) via signal emitter and receiver. These methods or systems cannot track and identify a relative position between the person and dangerous objects or dangerous area in real time, and thus it may not be easy to prevent an occurrence of an accident and may not be easy to identify responsibility after the accident.

SUMMARY

The present disclosure provides a method of avoiding a risk at workplace by combining position information of an object at a workplace with an indication including the first region with a first safety level and issuing an alert signal to avoid a risk for the object.

According to one aspect, a method is provided to avoid a risk at workplace. The method comprises establishing an indication including a workplace at a first region having a first safety level; determining a position of an object at the workplace and generating position information; and issuing a first alert signal if it is determined that the object is located in the first region based on the position information and the indication.

In one embodiment, the indication includes one of a layout of the workplace, a coordinate system of the workplace, and a look-up table of the workplace.

In another embodiment, the first region includes one of an assembly line, a machinery area, and a route of cargo vehicles.

In another embodiment, the method further includes updating the indication based on changes of the first region.

In another embodiment, determining a position of the object includes using a triangulation approach to finding the position of the object via signals from at least three receivers and wherein the signals are received from an emitter at a position of the object.

In another embodiment, the object is a pedestrian, and the method further includes disposing an emitter on one of safety shoes, a safety uniform, a safety helmet worn by the pedestrian.

In another embodiment, determining the position of the object includes determining the position using one of a thermal sensor positioning, a video image positioning, or a GPS positioning.

In another embodiment, issuing a first alert signal includes issuing the alert signal to one of a pedestrian, a cargo vehicle driver, and a machine operator.

In another embodiment, the method further includes disposing a buzzer on one of safety shoes, a safety uniform and a safety helmet worn by a pedestrian, a cargo vehicle driver, or a machine operator.

In another embodiment, issuing the first alert signal includes issuing a reminder alert to management personnel at the workplace.

In another embodiment, the indication further includes a second region with a second safety level, the method further includes issuing a second alert signal different from the first alert signal if it is determined that the object is located in the second region based on the position information and the indication.

In another embodiment, the indication further includes a third region with a third safety level, the method further includes not issuing an alert signal if it is determined that the object is located in the third region based on a position information In another embodiment, the method further includes determining a safety level of the object based on whether the object is located in the first region, the second region, or the third region.

In another embodiment, the method further includes issuing a reminder alert to management personnel while issuing an alert signal to the object.

According to another aspect, a method is provided to alert risk at a workplace. The work place may be divided into a first region with a first safety level and a second region with a second safety level, and the first region and the second region are defined in a reference system. The method comprises determining a position of an object in the reference system; determining whether the object is located in the first region or the second region based on the position of the object in the reference system; and issuing a first alert signal when it is determined that the object is in the first region, wherein the first and second regions have different risk levels to the object.

In one embodiment, the reference system is a coordination system, and the object is determined to be in the first region if a coordination of object is in a range of the first region in the coordination system and the object is determined to be in the second region if a coordination of the object is in a range of the second region in the coordination system.

In another embodiment, the first region may include one of an assembly line, a machinery area, and cargo vehicle routes in the workplace.

In another embodiment, the workplace is further divided to have a third region surrounding the workplace, and the second region is located between the first region and the third region. The method further comprises issuing a second alert signal when it is determined that the object is in the second region, and the second alert signal is different from the first alert signal, and no alert signal is issued when the object is in the third region.

According to another aspect, a system is provided to avoid risk at a workplace. The system comprises a positioning device to determine a position of an object in the workplace and generate position information; an alert device to issue a first alert in response to received alert instructions; and a controller configured to establish indication including a first region having a first safety level in the work place, and send the alert instruction to the alert device when it is determined that the object is located in the first region based the position information from the position device and the indication.

In one embodiment, the object is a pedestrian. The positioning device includes one of emitters disposed on safety shoes, a safety clothing, and a safety helmet of the pedestrian, at least of three receivers communicating with the emitter, and a processor configured to generate the position information based on communication among the emitters and the receivers via a triangulation positioning approach.

In one embodiment, the processor is integrated with the controller.

In another embodiment, the alert device includes a buzzer disposed on one of safety shoes, a safety clothing and a safety helmet worn by one of a pedestrian, a cargo vehicle driver, and a machine operator.

The methods and systems of the present disclosure avoid a risk at a workplace by establishing indication including a first region at a workplace with a first safety level, determining a position of an object at the workplace, and issuing a first alert signal to avoid an occurrence of the risk in the workplace if it is determined that the object is located in the first region based on the positioning information and the indication. The object is warned of the risk based on the region at which the object is located or the risk level exposed.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed methods and systems to avoid safety risk at a work place will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various methods and systems to avoid safety risk at a work place are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
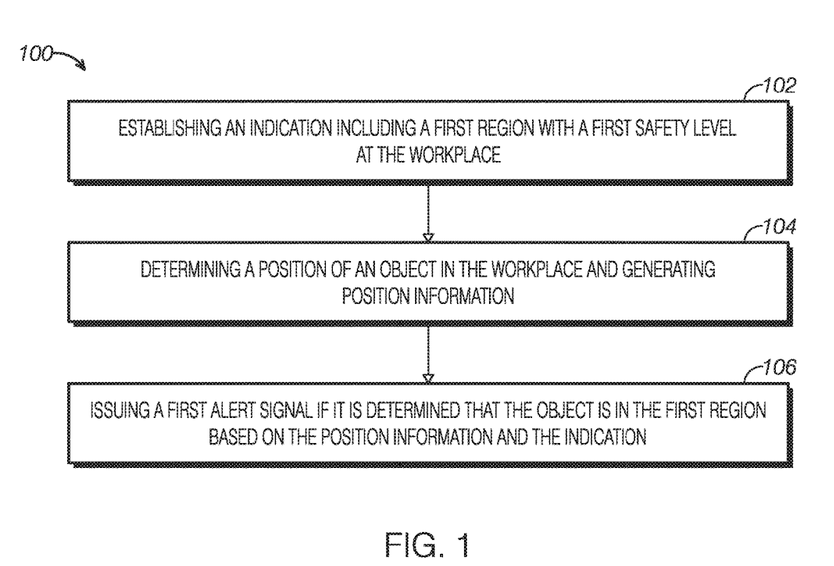
FIG. 1 is a flowchart of a method to avoid a safety risk at a workplace according to one embodiment of the present disclosure.
Figure 2:
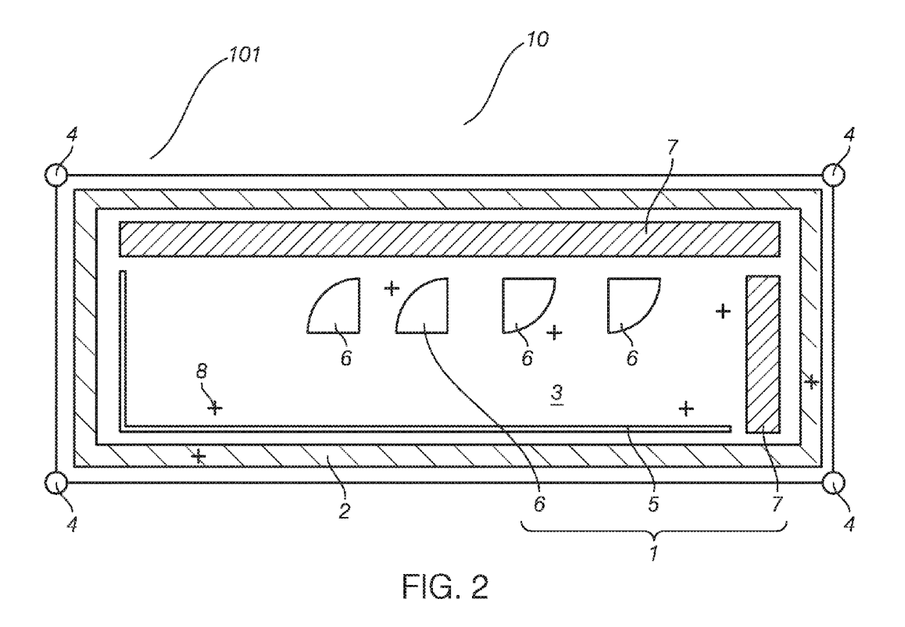
FIG. 2 is a schematic diagram of a workplace layout according to one example embodiment of the present disclosure.

As shown in FIGS. 1 and 2, according to one embodiment of the present disclosure, a method 100 is provided to avoid a safety risk at a workplace. The method comprises, at S102, establishing indication including a first region with a first safety level at the workplace; at S104, determining a position of an object 8 at the workplace and generating position information; and at S106, issuing an alert signal if it is determined that the object is in the first region based on the position information and the indication.

As described in detail, at step S102, the method 100 establishes an indication which includes a first region 1 with a first safety level at the work place. In a preferred embodiment, the first safety level is a dangerous level, and thus the first region 1 is a dangerous region. It should be understood that, in some embodiments, the first safety level may be other safety levels that needs to issue a first safety alert signal, and the first region may be a specific region predetermined to have the need to issue a first safety level alert signal. Furthermore, the indication may include at least one of a layout at the workplace, a workshop coordination system or a coordination system of the workplace, and of a lookup table of the workplace. In other words, the specific indication may be one a layout at a workplace, a coordination of a workplace, and a lookup table of a workplace.

In some embodiments, indication 10 may include a workplace layout diagram 101. Referring to FIG. 2, at least a portion of the layout diagram 101 is depicted. For a purpose of illustration, the layout diagram 101 includes a first region 1, which illustrates one or more relative positions of an assembly or production lines 7, machine areas 6, and cargo vehicle routes 5. In other embodiments, the indication may only include one first region. As it should be understood that the first region may also include other areas such as wet and slippery areas, storage areas for sensitive documents although the assembly lines 7, machinery areas 6, and the cargo vehicle routes 5 at the workplace are illustrated as the first region or the dangerous region.

Figure 3:
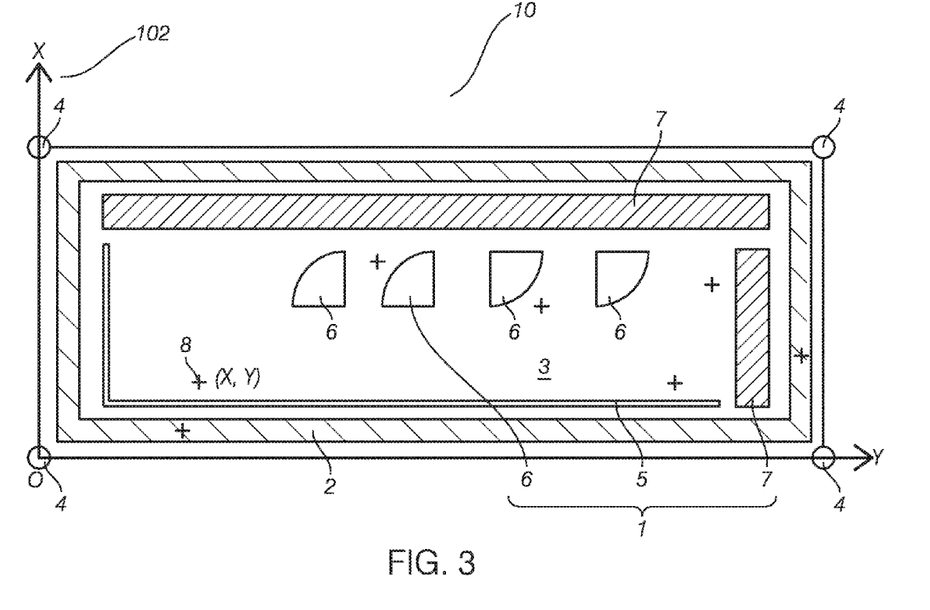
FIG. 3 is a schematic diagram of a coordination of the workplace according to one embodiment of the present disclosure.

In another embodiment as shown in FIG. 3, the indication 10 may include the coordination system of the workplace 102 that includes a coordination range of the first region 1 (e.g., the assembly line position 7, the machinery areas 6, and/or the cargo vehicle route 5). In some embodiments, the workplace may be a workshop. The XY coordination system is set up at the entire plane of the workshop. Each point in the first region has a X value and a Y value corresponding to the X axis and Y axis, and the coordination values of all points collectively constitutes a coordination range of the first region 1. Meanwhile, the object 8 has a value (x, y) in the XY coordination system. If the value (x, y) of the object 8 is within the coordination range of the first region 1, the object 8 may be judged to be in the first region 1.

Figure 4:
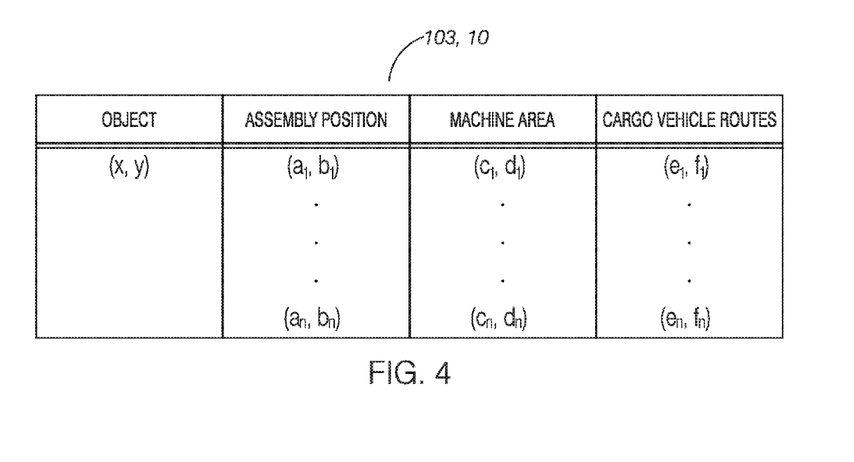
FIG. 4 is a schematic diagram of a lookup table of the workplace according to one embodiment of the present disclosure.

Referring to FIG. 4, in another embodiment, the indication may include a lookup table 103 that includes a value range of the first region (e.g., the assembly line position 7, the machine area 6, and/or the cargo vehicle route 5. That is, all values in the coordination system in FIG. 3 are taken out to form a table, i.e., a lookup table 103. For example, the lookup table 103 lists the coordination value (x, y) of the object 8. Further the look up table 103 lists collection of coordination values (a1, b1) . . . (an, bn) for each point in the assembly line 7, collection of coordination values (c1, d1) . . . (cn, dn) for each point in the machine area 6, collection of coordination value (e1, f1) . . . (en, fn) for each point in the cargo vehicle route 5. All of coordination values constitute the value range of the first region 1. If the coordination value (x1, y1) matches a coordination value in the lookup table 103 when comparing the coordination value (x1, y1), it is determined that the object 8 is in the first region 1. Similarly, the indication may include a lookup table that includes a value range of the second region (e.g., the area between the first region and a safe region). If the coordination value (x1, y1) matches a coordination value in the lookup table for the second region when comparing the coordination value (x1, y1), it is determined that the object 8 is in the second region 1.

In addition, establishment of the indication 10 further includes determining the first region 1 based on one of the production line position, machinery areas, and cargo vehicle routes. In one embodiment, positions of the assembly lines, the machinery areas, and the cargo vehicle routes may be determined first, and then these positions are marked in the workplace layout 101, or the coordination values of these positions are identified in the workshop coordination system 102, or the coordination values of these positions are listed in the lookup table 103. The first region 1 includes one or more of these positions, and the first region 1 may be marked, identified or listed accordingly.

In one embodiment, the method may include updating the indication when the first region 1 changes, such as the number of machines increase or decrease, the assembly line position changes, or the cargo vehicle route changes. For example, update of the indication 10 may include reestablishing new indication based on the newly located assembly line; or the range of the first region 1 in the original indication 10 may be increased or decreased.

Figure 5:
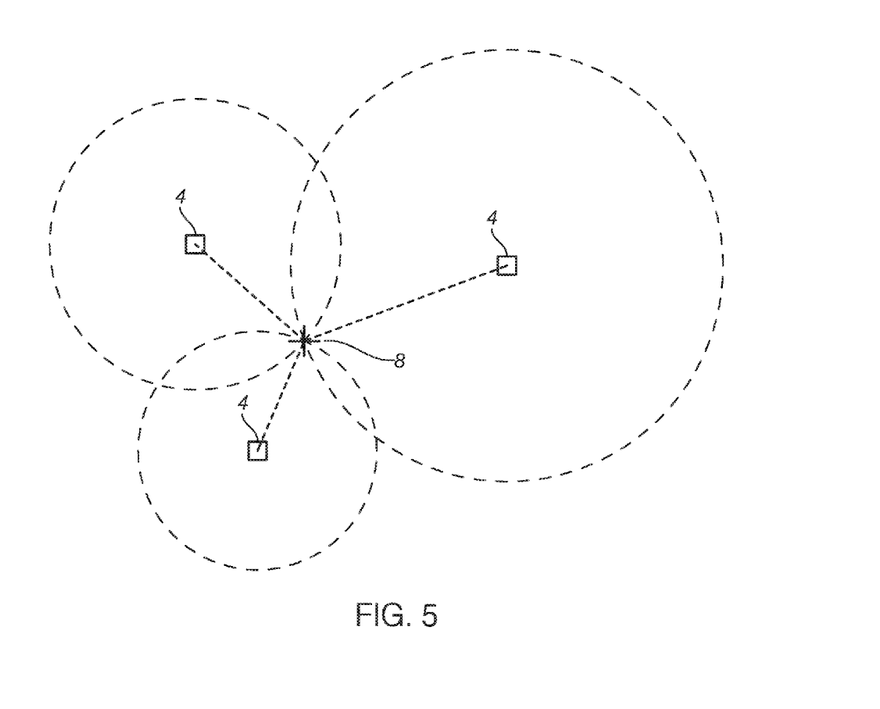
FIG. 5 is a schematic diagram illustrating a positioning method at a workplace according to one embodiment of the present disclosure.

With reference to FIGS. 2 and 5, the method of present disclosure then determines the position of the object 8. In one embodiment, the determination of the object may include determining the position of the object 8 based on a signal emitted from the position of the object 8 and received by at least three receivers using a triangulation positioning method. Triangle positioning method refers to a method where any three of the receivers 4 receive a signal emitted from the object 8, and detect a distance between each receiver 4 and the object 8 respectively. A circle is drawn using each position of the receivers 4 as a center of a circle, and each distance between the three receivers 4 and the object 8 as a radius, respectively. The point that three circles intersecting is the position of the object 8. This method can accurately determine a position of the object 8. Then, the processor generates position information on the object 8 based on the communication of the emitter and receiver 4 with any suitable positioning methods.

Although three receivers are used for positioning in the embodiment as illustrated above, it should be understood that the more receivers may be used, and thus more accurate positioning may be achieved. For example, four receivers are used as shown in FIG. 4. In addition, it should be understood that the triangle positioning method can be efficiently applied at an indoor such as the vehicle production plant for the positioning of the indoor pedestrians. It should be understood, however, other positioning methods may be used in this invention beside the triangle positioning method, such as at least one of thermal responsive positioning, image video positioning and GPS positioning.

In a preferred embodiment, the object 8 is a pedestrian, and the method further includes disposing emitters on one of safety boots, a safety uniform and a safety helmet worn by the pedestrian.

Furthermore, if the object is determined to be in the first region based on the positioning information and the indication, a first alert signal is issued. It should be understood that not only issues the first alert signal is issued to the object 8 (e.g., the pedestrian), but also the first alert signal may be issued to at least one of the cargo vehicle driver and the machine operator, and further a reminder signal may be issued to the management personnel at the workplace.

In a preferred embodiment, the first alert signal may be issued from an alert device disposed on at least one of the safety shoes, the safety clothing, or the safety helmet worn by the pedestrians, the cargo vehicle drivers, and the machine operators. The alert device may be any suitable devices that send warning to a person, such as a device to make sound, light, or vibration. In one embodiments, the alert device may be a buzzer. Under some circumstances, when the object 8 is positioned in the assembly line 7, the machinery area 6, or the cargo vehicle route 5 a reminder signal may be issued to the cargo vehicle driver and the machine operator while the first alert is issued to the object 8 so that the driver or the operator can take a measure such as braking in time in advance to prevent an occurrence of safety risk.

Referring to FIG. 2, the indication further includes a second region 3 with a second safety level, and the method also includes issuing a second alert signal different from the first safety signal if it is determined that the object 8 is located in the second region 3 based on the position information. The second safety level may be a level having less risk than the first safety level. Accordingly, the second region 3 may be a region having risk less than the region of the first region 1, such as a sub-safety region. In the embodiment depicted in FIG. 2, the second region 3 may be a region or a part of the region between the first region 1 and the third region 2, whose risk level is between the first region 1 and the third region 3.

When it is determined that the object 8 is located in the second region 3 based on the positioning information, a second alert signal different from the first alert signal may be issued. For example, the buzzer disposed on different portions of the object 8 may issue an alert signal, or a different sound from the same buzzer may be generated. For example, when the object 8 is in the region 1, the buzzer issues a sound along with a light signal and a vibration signal when the object 8 is in the second region, the buzzer may only issue the voice signal and vibration. The invention is not limited to the example embodiments. In another embodiment, the buzzer issues an alert signal with a quick pulse and high frequency when the object 8 is in the first region while the buzzer issues a sound signal with slower and lower frequency than the signal in first region 1 when the object 8 in the second region 3. In other words, it only needs to issue signals for the object to be warned to distinguish the alert signals to determine the object in different regions.

In addition, referring to FIG. 2, the indication also includes a third region 3 with a third safety level, the method also includes not issuing a first alert signal when it is determined that the object 8 is locate in the third region based on the positioning information. It should be understood that there is no alert signal when the object 8 is in the third region 2 (a safe region) as shown in FIG. 2; and an alert signal is issued to the object 8 (e.g., a first alert signal or a second alert signal) when the object 8 is in the first region 1 or in the second region 3.

Furthermore, the method also includes determining the safety levels based on whether the object 8 is in the first region 1, the second region 3, or the third region 2. The safety level is determined based on the possibility of the occurrences of the risk to the object 8. In the preferred embodiment, the first region 1 (risky region) may be classified to have the highest safety level, which is the level that the object 8 and/or the management personnel at the workplace should pay the most attention; the second region 3 may be classified as the next highest safety level (sub-safety region), and the third region 2 may be classified as a common safety level (safe region). Other classified regions may be applicable in the embodiments of this invention. When the object 8 safety level reaches to a certain level, an alert signal is issued, or a different type of signal alert is issued based on the safety level.

For the purpose of the illustration, the method 100 in the FIG. 1 shows implementing steps S102, S104, and S106 in order. It should be understood that the method may be implemented in accordance with other steps as necessity in other one more embodiments. For example, in an unlimited embodiment, the method may implement the step S104 to determine the object position, then implement step S102 to establish indication, finally implement step S106 to determine whether to issuing an alert signal. In addition, the method may also repeat implementation of one or more steps of S102, S104, and S106 based on a necessity.

In some embodiments, a workplace may be divided into a plurality of regions with different safety levels. For example, as shown in FIGS. 2 and 3, the workplace may be divided into a first region 1 with a first safety level and a second region 3 with a second safety level at the workplace. In some embodiments, the workplace may further include a third region 2 with a third safety level. The regions may be divided according to the risk exposed to people walking or standing in the workplace. For example, the first region 1 may include an assembly line, a machinery area, and/or cargo vehicle routes in the workplace and may represent a region that needs the most attention to the object 8. The third region 2 may be a surrounding area of the workplace and may be considered to be safe and no alert is needed. The second region 3 may be an area between the first region 1 and the third region 2 and an alert may still be needed for the object 8.

In some embodiment, a reference system may be used to define the plurality of regions and information on the plurality of regions may be stored in a memory of a processor of the system for risk avoidance. In one embodiment, the reference system may be a coordination system of the workplace. Each point of the regions had a X, Y coordinate and a range of the region may be defined by X, Y coordinate of points defining the borders of the regions. In another embodiment, the reference system may be a lookup table with collection of X, Y coordinate and the range of each region is defined by corresponding values in the lookup table. The object 8 located in the workplace may have a value in the reference system. A routine or a method may be executed to perform acts of determining a position of the object 8 in the reference system; determining whether the object is located in the first region or the second region based on the position of the object in the reference system; and issuing a first alert signal when it is determined that the object is in the first region. The position of the object 8 may be determined by any suitable approaches, such as the approaches described above. The region that the object 8 is located may be determined by any suitable data processing, such as comparing the value of the position of the object 8 with the ranges of the ranges in the reference system. The first alert signal may be issued from an alert device disposed on the object 8.

Figure 6:
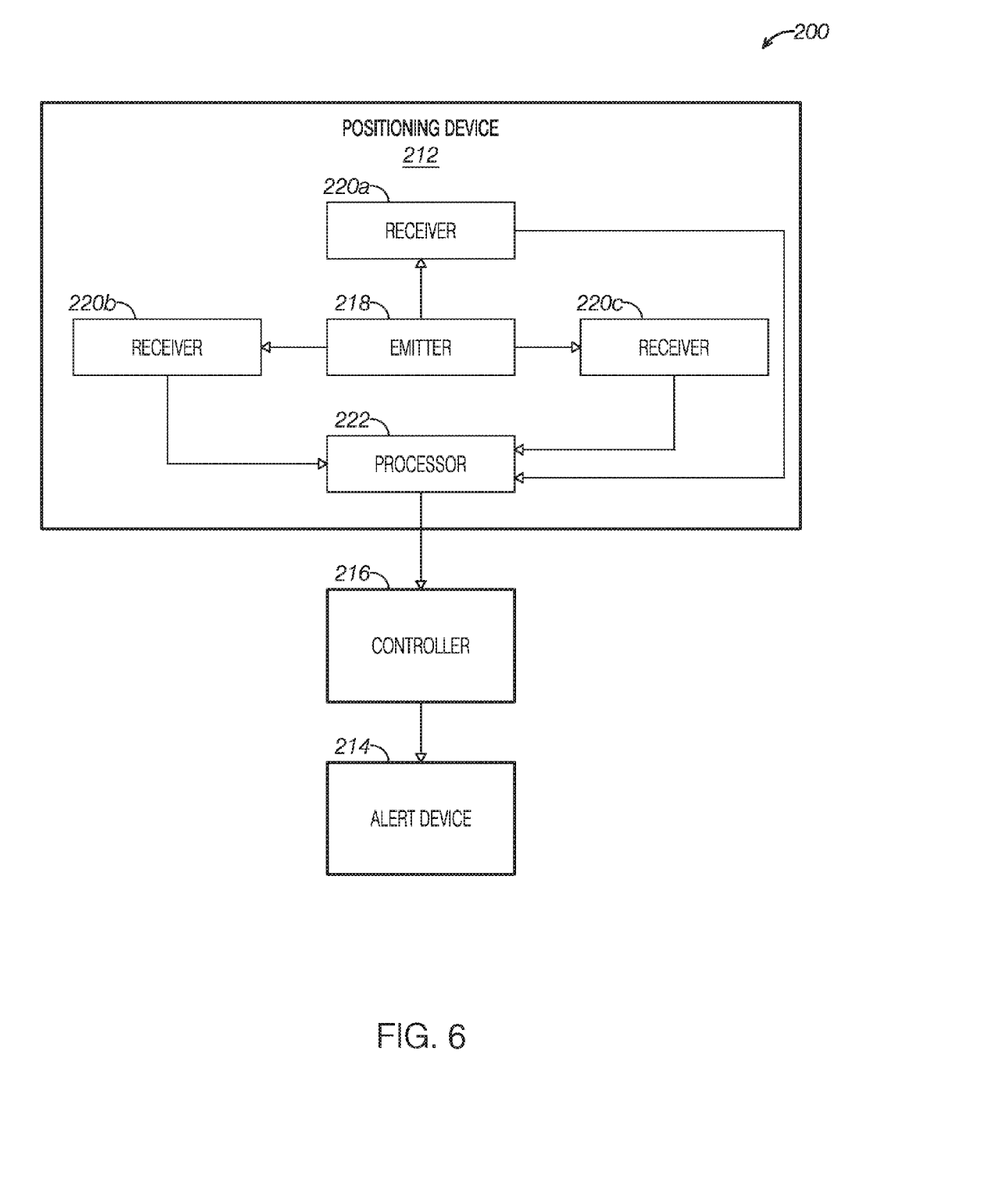
FIG. 6 is a block diagram of a system for workplace safety risk avoidance, illustrating communication between a positioning device, an alert device and a controller.

FIG. 6 shows a block diagram of a system for workplace safety risk avoidance 200. The system 200 may include a positioning device 212 to determine a position of the object 8 at a workplace and generate position information; an alerting device 214 to issue an alert signal in response to the received instructions; and the controller 216 configured to establish an indication including a first region with a first safety level, issues alert instructions to the alerting device 214 when it is determined that the object 8 is in the first region based on the position information from the positioning device and indication. In some embodiments, the controller 216, the positioning device 212 and the alert device 214 may be communicated via wireless communication links. The positioning device 212 of the system 200 may further include an emitter 218 disposed on the object 8 and a plurality of receivers 220a, 220b, 220c. The plurality receives 220a, 220b, 220c may be located at different places of the workplace, receive the signal from the emitter 18 and transmit the signal information to a processor 222. The positioning device 212 may include at least three receiver 220a, 220b and 220c and may be positioned at edge portions of the workplace and surrounds the object 8 in such way to enable the determination of the position of the object 8.

Determination of the object position in the real time and marking the position and identification of the object in specific regions can alert or remind the people in advance to prevent a risk and an occurrence of the unexpected accident occurrence.

As described above, the controller 216 is configured to establish an indication including a first region with a first safety level, issues alert instruction to alerting device when it is determined that the object 8 is in the first region based on the position information from the positioning device and indication. In the embodiment depicted in FIG. 2, the first region 1 may include an assembly line position 7, machinery area 6, and cargo vehicle route 5. The third region 2 (safe region) may be a round ring area or a rectangular ring area around the workplace, which may be a walking area, a tour or inspection area to observe/inspect the production system. The second region 3 (the second most safety region) may be all area between the first region 1 and third region 2, which functions to have certain a warning effect. In some embodiments, a reference system such as a coordination system or a lookup table is established for the workplace, programmed and stored in the controller 16. In some embodiments, a reference system is established to define a plurality of regions in the workplace. The information on the regions such as the ranges of the regions in the reference system is stored in the controller 216. The information on the regions may be updated when the operation and/or the layout of the workplace are changed.

In one embodiment, the object is a pedestrian, the positioning device 212 includes one or more signal emitters disposed on one of the safety shoes, a safety clothing, and a safety helmet worn by the pedestrian, at least three signal receivers 220a, 220b, 220c communicating with the signal emitters 218, and a processor 222 configured to communicate with the emitters 218 and the receivers 220a, 220b, 220c and generate the position information using a triangle positioning method. In a preferred embodiment, the processor 222 and the controller 16 are configured to be an integrated unit for easy installation and minimizing the communication distance. In some embodiments, the processor 222 and the controller 216 may be integrated part of a control system in the work place. That I, a main processor and a memory may be used to execute the methods or the routines described above.

In one embodiment, the receivers may be installed in the workplace, such as at the four corners of the workplace or a workshop. In other embodiments, the receivers may be installed outside of the workplace. As shown in FIG. 5, the triangle positioning method may refer to any three of receivers 4 receive a signal emitted from the object 8, and determine distance between each receiver 4 and the object 8 respectively, then uses each position of the receivers 4 as a center of the circle, and each distance between the three receivers 4 and the object 8 as a radius to result in a crossover point to find a real position for the object 8. The method can accurately make positioning and find a pedestrian position indoor.

In one embodiment of the present disclosure, the emitter 218 may be disposed on one of the safety shoes, a safety clothing, or a safety helmet worn by the pedestrian. Under some circumstances, it may be understood that any one of the safety shoes, the safety clothing, and the safety helmet worn by the pedestrian may be installed with one or more signal emitters. A plurality of the emitters can accurately determine a pedestrian position to minimize error.

In preferred embodiments, each one of the emitters may emit different type of signals to prevent the inaccurate positioning of a pedestrian at the situations wherein a specific signal may be interfered. It should be understood that these signals may be ultrasound, electromagnetic wave, infrared wave, or other signals that can determine a distance. Accordingly, the receiver/emitter may also be ultrasound receiver/emitter, electromagnetic wave receiver/emitter, infrared wave receiver/emitter, for example.

The alert device 214 may include a buzzer disposed on one the safety boots, safety clothing, and safety helmet worn by at least one of the pedestrian, the cargo vehicle driver, or the machinery operator. It should be understood that the buzzer may be a voltage buzzer, electromagnetic buzzer, or combination of the two buzzers. Under some circumstances, the buzzer may be other alert devices issuing alert signals.

According to one embodiment, the positioning device 212 may position the entire object 8, or positioning a part of the object 8 (for example, a pedestrian's torso) separately. In one embodiment, there may be sufficient emitters in the pedestrian's clothing such that it is capable to determine if the pedestrian's torso/limb is in a danger zone based on the motion of the pedestrian. In another embodiment, the processor may estimate the pedestrian's moving trend via positioning of the pedestrian's torso/limb. If the pedestrian has tendency to approaching a dangerous region, an alert signal is issued.

According to one embodiment, it may determine whether the pedestrian is responsible for an accident based on determination at step S106. For example, during an accident, if the pedestrian was in the first region (dangerous zone) when the accident is occurred, it may be possible that the pedestrian is responsible for the accident.

According to one embodiment, a reminder signal is issued to the management personnel at the workplace while issuing an alert signal. As such, the management personnel may also take actions to prevent occurrence of an accident while alerting the pedestrian.

It should be understood that the method and the system to avoid risk in the workplace of the present invention may apply to a place of the vehicle assembly/production line. If possible, the method to avoid the risk at the workplace may be used in the fields other than the field of auto industry. For example, it may apply to a workplace to manufacture the generators or other places that need a safety alert, which may apply according to the situations and there is no limitation on the application of the present invention.

It should be understood that one or more of the illustrated acts or functions may be repeatedly performed depending on the particular strategy being used. Further, the described acts may graphically represent code to be programmed into computer readable storage medium in the engine control system.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into computer readable storage medium in the engine control system.

It will be appreciated that the configurations and routines disclosed herein are exemplary in nature, and that these specific embodiments are not to be considered in a limiting sense, because numerous variations are possible.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A method to avoid safety risk in a place including a vehicle assembly line, comprising:
   establishing an indication including a first region with a first safety level at the place;
   determining a position of an object in the work place and generating position information; and
   issuing a first alert signal if it is determined that the object is in the first region based on the position information and the indication; and
   updating the indication according to a change of the first region.

2. The method of claim 1, wherein the indication includes one of a layout diagram of the work place, a coordination system of the workplace and a lookup table of the workplace.

3. The method of claim 1, wherein the first region includes one of an assembly line position, a machine region, and a cargo vehicle route.

4. The method of claim 1, wherein determining the position of the object includes determining the position of the object using a triangulation positioning approach based on signals from at least three receivers and wherein the three receivers are configured to receive a signal from emitters at a position of the object.

5. The method of claim 4, wherein the object is a pedestrian, the emitters are disposed on one of safety shoes, a safety clothing, a safety helmet worn by the pedestrian.

6. The method of claim 1, wherein determining the position of the object includes determining the position using one of a thermal responsive positioning, an image positioning and a GPS positioning.

7. The method of claim 1, wherein issuing the first alert signal includes issuing the first alert signal to one of a pedestrian, a cargo vehicle driver, and a machine operator.

8. The method of claim 7, wherein the first alert is issued from a buzzer disposed on one of safety shoes, a safety clothing and a safety helmet worn by one of the pedestrian, the cargo vehicle driver and the operator of the machine operator.

9. The method of claim 1, wherein issuing the first alert signal includes issuing a reminder alert signal to management personnel at the workplace.

10. The method of claim 1, wherein the indication further includes a second region having a second safety level, the method further includes issuing a second alert signal different from the first alert signal if it is determined that the object is in the second region.

11. The method of claim 1, wherein the indication further includes a third region having a third safety level, the method further includes not issuing the first alert signal if it is determined that the object is in the third region.

12. The method of claim 1, further comprising determining whether the object is responsible for an accident based on the position information and the indication.

13. A method to alert risk at a workplace, the work place is divided into a first region with a first safety level and a second region with a second safety level, the method comprising:
   defining the first region and the second region in a reference system; wherein the first and second regions have different risk levels to the object, and the first region includes one of an assembly line, a machinery area, and cargo vehicle routes;
   determining a position of an object in the reference system;
   determining whether the object is located in the first region or the second region based on the position of the object in the reference system;
   issuing a first alert signal when it is determined that the object is in the first region and;
   reestablishing an updated first region based on a changed location of one of the assembly line, the machinery area, and the cargo vehicle routes.

14. The method of claim 13, wherein the reference system is a coordination system, and wherein the object is determined to be in the first region if a coordination of object is in a range of the first region in the coordination system and the object is determined to be in the second region if a coordination of the object is in a range of the second region in the coordination system.

15. The method of claim 13, wherein the workplace is further divided to have a third region surrounding an area including the assembly line, the machinery area and the cargo vehicle routes, wherein the second region is located between the first region and the third region, and the method further comprising issuing a second alert signal when it is determined that the object is in the second region, and the second alert signal is different from the first alert signal and no alert signal is issued when the object is in the third region.

16. A system to avoid safety risk at a workplace, comprising:
   a positioning device to determine a position of an object in the workplace and generate position information;
   an alert device to issue a first alert signal in response to received alert instructions; and
   a controller configured to establish an indication including a first region having a first safety level in the workplace, issue the alert instructions to the alert device when it is determined that the object is in the first region based the position information from the position device and the indication, and update the indication according to a change of the first region.

17. The system of claim 16, wherein the object is a pedestrian, the positioning device includes one of emitters disposed on one of safety shoes, a safety cloth, and a safety helmet worn by the pedestrian, at least three receivers communicated with the emitters and located at different places of the workplace, and a processor configured to generate the position information using a triangulation method based on the communication between the emitters and the receivers.

18. The system of claim 16, wherein the alert device includes a buzzer disposed in at least one of a safety shoe, a safety cloth and a safety helmet worn by one a pedestrian, a driver of the cargo vehicle, and an operator of the machine.

19. The system of claim 16, wherein the controller is further configured to determine whether the object is responsible for an accident based on the position information and the indication.

* * * * *